United States Patent
Damrath et al.

(10) Patent No.: US 6,870,141 B2
(45) Date of Patent: Mar. 22, 2005

(54) METHOD FOR DRIVING APPLIANCES AND HOUSEHOLD APPLIANCE WITH ENERGY MANAGEMENT

(75) Inventors: Joachim Damrath, Bachhagel (DE); Klaus Grunert, Berlin (DE); Christian Hafer, Erding (DE); Walter Sams, Lappersdorf (DE); Markus Spielmannleitner, Ellwangen (DE); Gerhard Wetzl, Sontheim (DE)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 0 days.

(21) Appl. No.: 10/446,979

(22) Filed: May 27, 2003

(65) Prior Publication Data

US 2003/0216818 A1 Nov. 20, 2003

Related U.S. Application Data

(63) Continuation of application No. PCT/EP01/13121, filed on Nov. 13, 2001.

(30) Foreign Application Priority Data

Nov. 24, 2000 (DE) .......................................... 100 58 404

(51) Int. Cl.[7] ................................................ H05B 1/02
(52) U.S. Cl. ........................ 219/490; 219/497; 219/483; 307/39
(58) Field of Search ................................ 219/490, 497, 219/501, 483, 485, 486, 412, 413; 307/117, 38, 39, 40, 41

(56) References Cited

U.S. PATENT DOCUMENTS

| | | | | |
|---|---|---|---|---|
| 3,970,861 A | * | 7/1976 | McCollum ................... 307/35 |
| 4,117,537 A | * | 9/1978 | Muench ...................... 700/295 |
| 4,324,987 A | * | 4/1982 | Sullivan et al. ............... 307/35 |
| 4,349,879 A | | 9/1982 | Peddie et al. |
| 5,191,191 A | | 3/1993 | St. Aubyn |
| 5,521,359 A | * | 5/1996 | Bone .......................... 219/679 |
| 5,864,456 A | * | 1/1999 | Connor ...................... 361/93.7 |

FOREIGN PATENT DOCUMENTS

| | | |
|---|---|---|
| DE | 40 23 846 A1 | 4/1992 |
| DE | 197 48 134 A1 | 5/1999 |
| DE | 198 24 168 A1 | 12/1999 |

\* cited by examiner

*Primary Examiner*—Mark Paschall
(74) *Attorney, Agent, or Firm*—Laurence A. Greenberg; Werner H. Stemer; Gregory L. Mayback

(57) ABSTRACT

A method for driving appliances and a household appliance for operating two household appliances includes connecting a first household appliance to an electrical wall outlet and disposing an appliance plug receptacle inside the first household appliance, for example, an ironing dummy. The second household appliance, for example, a pressing iron is plugged into the plug receptacle. To prevent an overloading of the electrical mains, a regulating unit disposed inside the first household appliance regulates the current consumption of at least one of these household appliances.

20 Claims, 1 Drawing Sheet

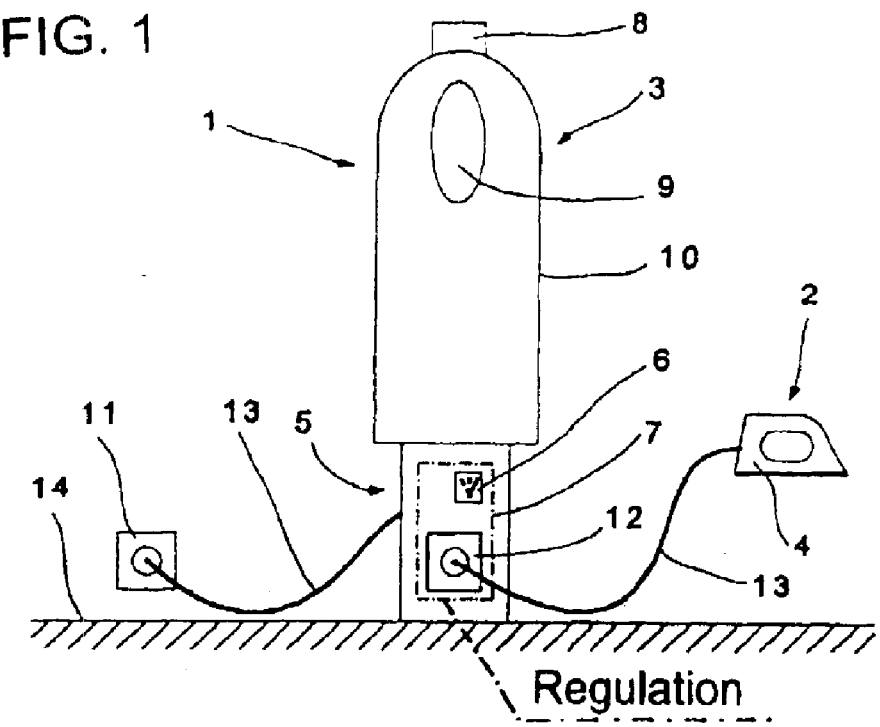
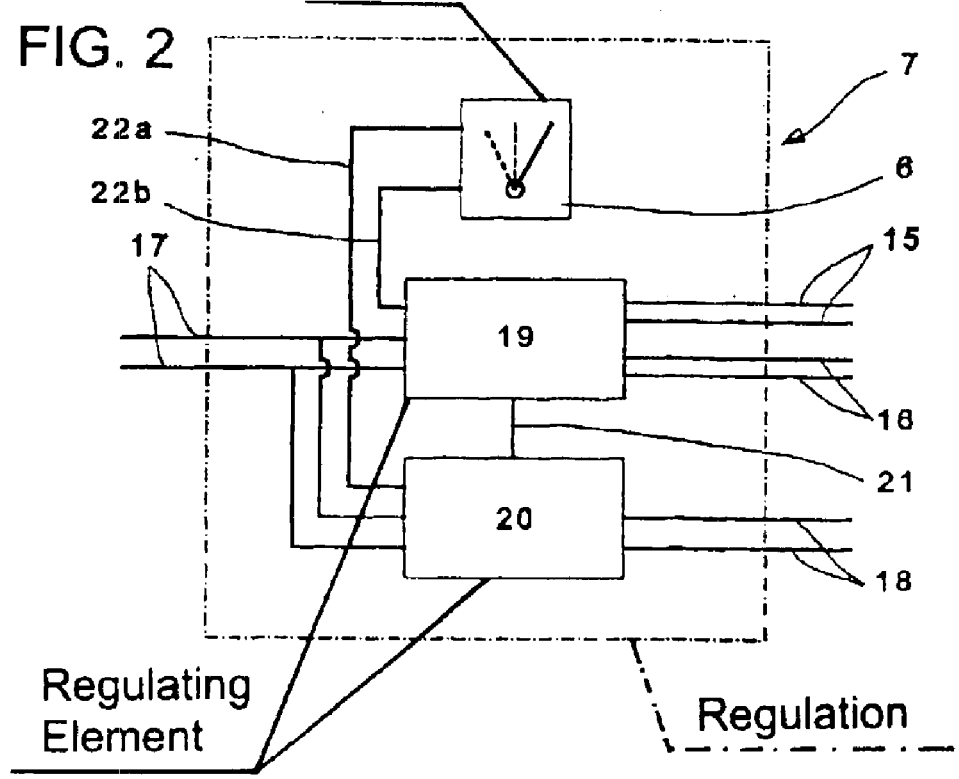

METHOD FOR DRIVING APPLIANCES AND HOUSEHOLD APPLIANCE WITH ENERGY MANAGEMENT

CROSS-REFERENCE TO RELATED APPLICATION

This application is a continuation of copending International Application No. PCT/EP01/13121, filed Nov. 13, 2001, which designated the United States and was not published in English.

BACKGROUND OF THE INVENTION

Field of the Invention

The invention relates to a method and a household appliance for driving two household appliances.

In recent years, the electrification of the household has markedly expanded. The connected loads of household appliances have also increased. The increase in connected loads—that is, in the power of the devices—is also attributable to the fact that a higher power reduces the required work time with the appliance. In other words, if, for instance, an iron has more power, the ironing time is shorter.

Some appliances are equipped with a plug socket for plugging in another appliance. For instance, electric stoves are known appliances that include outlets. Then, a hand mixer can be plugged into these outlets as needed.

But, if the appliance is an appliance such as a device for ironing shirts, for instance, an ironing dummy, which has a connected load greater than or equal to 10 Amperes, and, if there is an outlet located therein, then a circuit overload can occur if another current consumer is plugged in, such as an iron with a connected load up to 9 Amperes. Given fuse protection of household circuits with 16 Amperes, for instance, either the blow-out fuse is blown or the automatic circuit breaker is tripped. If these fuses exhibit what is referred to as fast-action response behavior, it is impossible for the user to prevent the circuit breaker response even by quickly unplugging the second current consumer.

These circumstances are further complicated by the fact that, when an iron is plugged into a possible outlet of an ironing dummy, if the iron is cold, the built-in switching temperature regulator is always closed, and, therefore, the iron's full power consumption ensues immediately upon the plugging in of the iron.

SUMMARY OF THE INVENTION

It is accordingly an object of the invention to provide a method for driving two household appliances and a household appliance for driving two household appliances with energy management that overcome the hereinaforementioned disadvantages of the heretofore-known devices and methods of this general type and with which it is possible to connect a second household appliance into an outlet of the first appliance without causing a circuit overload.

With the foregoing and other objects in view, there is provided, in accordance with the invention, a method for driving two electrical appliances, including the steps of providing a first appliance with an outlet, drawing a current supply of the first appliance from a wall terminal, drawing a current supply of a second appliance from the outlet, regulating power consumption for at least one of the first and second appliances, and integrating over time at least one of a current and the power consumption of the at least one of the first and second appliances having regulation of the power consumption and utilizing the integral of the at least one of the current and the power consumption to control the at least one of the first and second appliances.

With the objects of the invention in view, there is also provided an appliance including a mains-powered body having an electrical connection to be connected to a mains-powered wall terminal for drawing a current supply, a built-in outlet for another mains-powered appliance, and a current regulating unit having at least one regulating element connected to the electrical connection and to the built-in outlet for regulating power consumption for at least one of the mains-powered body and the other mains-powered appliance, the current regulating unit integrating over time at least one of a current and the power consumption of at least one of the mains-powered body and the other mains-powered appliance and controlling at least one of the mains-powered body and the other mains-powered appliance dependent upon the integral of the at least one of the current and the power consumption. The mains-powered body can be an ironing dummy.

A first household appliance that is connected directly or indirectly (e.g., by way of a connecting lead) to an electrical wall terminal, which has its own high power consumption and which is to be equipped with a heavy-duty outlet for a second appliance, can be realized only if the power consumption in the first appliance is regulated, because the current paths for the individual appliances branch there, so that the current paths can be separately measured and regulated. Because, in general, the two appliances do not continuously draw an equal amount of current during operation, during periods of low power consumption by one device, the other device is able to work without reducing its power consumption. The term "regulate" is meant to encompass switching regulation as well.

In the scope of the invention, the first appliance can also be an electric stove (which has a high power consumption per current conductor, particularly, if it is connected in monophase), and the second appliance can also be a vacuum cleaner (likewise, a high power consumption).

In accordance with a further feature of the invention, if the first appliance is the one with the higher power consumption, it is expedient to regulate that appliance. When this power consumption is regulated, the current reduction has a greater absolute effect on the overall power consumption but the first appliance can still work with adequate power. The second appliance, for instance, an iron, can operate intermittently. Thus, given regulating of the first appliance, its power would be limited only slightly and intermittently, and only at times of power consumption by the second appliance.

In accordance with an added feature of the invention, it can also be advantageous to regulate the power consumption of the second appliance only. Such regulation occurs when the peak value of the power consumption for the first device is unavoidable, for instance, because particular operations can only be satisfactorily handled that way.

In accordance with an additional feature of the invention, it can also be advantageous to regulate the power consumption of both appliances. This is associated with a selective reduction of the power consumption for both appliances, although the reduction need not be so extensive for both appliances as when only one of the appliances is regulated.

In accordance with another feature of the invention, the first appliance is an ironing dummy and the second appliance is an iron.

For an appliance to be capable of this kind of energy management in connection with another appliance, a current regulating unit is needed. This current regulating unit expediently includes a current sensor, namely, in the form of a shunt resistor, and is, expediently, disposed in the first appliance because the current paths for the appliances can already branch there. All that is required by the second appliance in such a case is the relevant connecting lead for carrying the desired power to this device. The wall terminal can be an outlet or a terminal box.

It should be noted, in this regard, that an energy management beyond household appliances would also be technically possible, in principle. This can be realized because both appliances draw their current from one wall terminal. If there is a measuring line for each connecting lead of the appliances ending in a clip-on current measuring device, then the external current regulating unit would have information about the instantaneous power consumptions. But, control lines would have to be led to the appliances so that the power consumptions could be influenced. Such a solution is not feasible, because of the risk of the measuring lines and control lines getting mixed up, and because the external current regulating unit must also be furnished with a current supply. Based on these considerations, it is particularly expedient to dispose the current regulating unit in the first appliance. When two appliances form a "chain" (wall terminal, first appliance, second appliance), but there is an outlet only in one appliance, the hierarchy and configuration of the appliances being unambiguously marked. Furthermore, the inventive configuration forgoes external lines for measuring, controlling, and power supply, as well as a separate housing.

In accordance with yet another feature of the invention, it is also advantageous, in this regard, when the first household appliance is equipped with a priority switch. The switch can select the appliance whose power consumption will be influenced or the appliance whose power consumption will not to be influenced. In a third position of the priority switch, both appliances can be operated or selected.

In accordance with yet a further feature of the invention, at least one regulating element is disposed in a current regulating unit. This regulating element can handle the regulating by various mechanisms or components. The current that is to be regulated can be conducted by way of a thermally responsive conductor. If the conductor is constructed as bimetal strips, it buckles when loaded by a corresponding current load, whereby, it can open a contact. On the other hand, if the regulating element is constructed as a coil, then a force is generated given a corresponding current, which also can open a contact.

In accordance with yet an added feature of the invention, it is advantageous when at least one regulating element has an electromagnetically responsive mechanism for regulating at least one of the body and the other mains-powered appliance.

In accordance with yet an additional feature of the invention, it is advantageous when a regulating element is constructed as a thyristor or triac circuit because there are no moving components and, therefore, no wearing components. But it is also possible to utilize a relay.

The regulating of the power consumption of an appliance can be achieved by phase-angle control or clocking, whereby the switching always occurs in the zero passage in the latter case.

In accordance with a concomitant feature of the invention, a regulating element can also be inventively constructed such that a single regulating element regulates the power consumption of both appliances.

Other features that are considered as characteristic for the invention are set forth in the appended claims.

Although the invention is illustrated and described herein as embodied in a method for driving two household appliances and a household appliance for driving two household appliances with energy management, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a fragmentary plan view of a spatial configuration of first and second appliances according to the invention; and FIG. 2 is a block circuit diagram of a current regulating unit according to the invention.

DESCRIPTION OF THE PREFERRED EMBODIMENTS

Referring now to the figures of the drawings in detail and first, particularly to FIG. 1 thereof, there is shown a first appliance 1—an ironing dummy 3 in this case—is conductively connected to a wall terminal 11 by a connecting lead 13. The ironing dummy 3, superficially, has a base 5 and an inflated bag 10. A neck 8 and arm 9 can be formed on the inflated bag 10. A current regulating unit 7 and an outlet 12 are inventively disposed in the ironing dummy 3. The outlet 12 and the current regulating unit 7 are, advantageously, disposed in the base 5 of the ironing dummy 3 because such a configuration improves the stability and because the structures there (as opposed to inflated bag 10) are sufficiently rigid to secure this fixed equipment.

A second appliance 2, here, an iron 4, is conductively connected to the outlet 12 of the first appliance 1 by a second connecting lead 13. By a priority switch 6, which is disposed in the vicinity of the current regulating unit 7 and is also conductively connected in this exemplifying embodiment, it is possible to select which appliance 1, 2 has priority in the current supply during operation. The priority switch can also be connected to the current regulating unit 7 by a longer cable so that priority can be selected for one of the appliances 1, 2 from a non-illustrated ironing board or another convenient location. In particular, the priority behavior in the ironing dummy can also be set so that it cannot be modified by a user.

FIG. 2 illustrates an exemplary embodiment of remaining wiring of the current regulating unit 7. Lines 17 to the wall terminal 11 appear on the left side. Outside the first appliance 1, these lines 17 are merged in the connecting lead 13 (left). The lines 17 branch ahead of the regulating elements 19, 20 so that they pass through these regulating elements separately. Extending at the output of the regulating element 19 (right) are lines 15 to the non-illustrated fan for inflating the inflated bag 10 or lines 16 to the non-illustrated heater for the airflow for inflating the inflated body 10, or lines to a non-illustrated heat accumulator for heating the airflow for inflating the ironing dummy 3. These features are not illustrated for clarity and because they are known as conventional parts of the dummy 3. At the output of the regulating element 20 (right) are lines 18, which are connected to the outlet 12. The lines 15, 16, 17, 18 are respectively represented with their conductors P (phase) and N (zero conductor). The representation of the protective conductor (also referred to as a ground conductor) has been omitted. It should be noted that the P and N conductors need not necessarily be led through the regulating elements, it suffices when only one of the two conductors is led through.

The two regulating elements 19, 20 are connected to one another by at least one line 21 so that the power consumption of one appliance can be regulated in dependence upon the instantaneous power consumption of the other appliance. The priority switch 6 is connected to the regulating elements 19, 20 by control lines 22a, 22b. The power consumption of either the appliance 1 or the appliance 2, or of both appliances, is regulated by the circuit logic in the regulating elements according to the position of the priority switch.

In the ironing dummy 3, it can be provided that the heat accumulator heats during the operating pauses of the fan and the heater of the ironing dummy 3, and a thermostat circuit holds a specified temperature. That way, a heater with a low power can be utilized so as not to exceed the maximum permissible installed load in a household. As soon as the fan and the heater are switched on for a defined, settable time for purposes of ironing a shirt placed thereon, the heater of the heat accumulator is switched off to limit the overall power consumption. Both the heater for the airflow and that for the heat accumulator can be constructed in multiple parts so that different parts of a heater are driven individually or in combination in dependence upon the permissible total power consumption (e.g., 10 or 15 Amps).

When the priority circuit is set so that the iron 4 always has priority over the ironing dummy 3, the current feed into the ironing dummy 3 may be interrupted or occasionally reduced according to the switching of the thermostat in the iron. As long as the iron 4 is consuming current at a time in which the heat accumulator is being heated, its heating is interrupted, with the only consequence being that the heating of the heat accumulator to the desired temperature is delayed. In such a case, the ironing process, whereby the heater of the heat accumulator is switched off, and the heaters for the airflow and the fan are switched on, can be started only later.

However, if the iron 4 is consuming current at a moment when the fan and the heater for the airflow are active during the ironing process, these are switched off, and the running ironing process is interrupted. As soon as the iron 4 no longer is consuming current, the ironing process is continued. To achieve a uniformly good ironing result despite the possible interruptions of the ironing process, the ironing process is controlled according to the amount of heat that has been applied. To that end, the heat output applied over time is integrated, and when the desired heat quantity is achieved, the ironing process is ended. Consideration can also be given as to whether or not the heater for the airflow is being driven at a lower power level due to the maximum permissible installed load. Because the power of the heater, which is driven at a specified power level, is approximately constant over time, the integral of the heat quantity can be advantageously achieved simply by totaling the turn-on times of the heater in consideration of the utilized power level.

We claim:

1. A method for driving two electrical appliances, which comprises:

providing a first household appliance with an electrical outlet;

drawing a current supply of the first appliance from a wall terminal;

drawing a current supply of a second appliance from the electrical outlet;

regulating power consumption for at least one of the first and second appliances; and integrating over time at least one of a current through and the power consumption of the at least one of the first and second appliances having regulation of the power consumption and utilizing the integral of the at least one of the current and the power consumption to control the at least one of the first and second appliances.

2. The method according to claim 1, which further comprises:

providing the first appliance as an ironing dummy; and
providing the second appliance as an iron.

3. The method according to claim 1, which further comprises regulating the power consumption of the first appliance.

4. The method according to claim 1, which further comprises regulating the power consumption of the second appliance.

5. The method according to claim 1, which further comprises regulating the power consumption of both of the first and second appliances.

6. The method according to claim 1, which further comprises carrying out the regulation of the at least one of the first and second appliances as a switching regulation.

7. A method for powering two electrical household appliances, which comprises:

providing an ironing dummy with an electrical outlet;

drawing a current supply of the ironing dummy from a wall terminal;

drawing a current supply of an iron from the outlet;

regulating power consumption for at least one of the ironing dummy and the iron; and integrating over time at least one of a current through and the power consumption of the at least one of the ironing dummy and the iron having regulation of the power consumption and utilizing the integral of the at least one of the current and the power consumption to control the at least one of the ironing dummy and the iron.

8. A household appliance, comprising:

a mains-powered body having:
    an electrical connection to be connected to a mains-powered wall terminal for drawing a current supply;
    a built-in electrical outlet for another mains-powered household appliance; and
    a current regulating unit having at least one regulating element connected to said electrical connection and to said built-in outlet for regulating power consumption for at least one of said mains-powered body and the other mains-powered appliance, said current regulating unit integrating over time at least one of a current and the power consumption of at least one of said mains-powered body and the other mains-powered appliance and controlling at least one of said mains-powered body and the other mains-powered appliance dependent upon said integral of the at least one of the through current and the power consumption.

9. The appliance according to claim 8, wherein said current regulating unit has a priority switch.

10. The appliance according to claim 9, wherein said priority switch is connected to said at least one regulating element for selectively regulating said body and the other mains-powered appliance.

11. The appliance according to claim 8, wherein said at least one regulating element has a thermally responsive mechanism.

12. The appliance according to claim 8, wherein said at least one regulating element has a thermally responsive mechanism for regulating at least one of said body and the other mains-powered appliance.

13. The appliance according to claim 8, wherein said at least one regulating element has an electromagnetically responsive mechanism.

14. The appliance according to claim 8, wherein said at least one regulating element has an electromagnetically responsive mechanism for regulating at least one of said body and the other mains-powered appliance.

15. The appliance according to claim 8, wherein said at least one regulating element has a thyristor circuit.

16. The appliance according to claim 8, wherein said at least one regulating element has a thyristor circuit for regulating at least one of said body and the other mains-powered appliance.

17. The appliance according to claim 8, wherein said at least one regulating element has a triac circuit.

18. The appliance according to claim 8, wherein said at least one regulating element has a triac circuit for regulating at least one of said body and the other mains-powered appliance.

19. The appliance according to claim 8, wherein said at least one regulating element regulates at least two electrical consumers.

20. An ironing dummy, comprising:

a mains-powered ironing body having:
    an electrical connection to be connected to a mains-powered wall terminal for drawing a current supply;
    a built-in electrical outlet for another mains-powered appliance; and
    a current regulating unit having at least one regulating element connected to said electrical connection and to said built-in outlet for regulating power consumption for at least one of said ironing body and the other mains-powered appliance, said current regulating unit integrating over time at least one of a through current and the power consumption of at least one of said ironing body and the other mains-powered appliance and controlling at least one of said ironing body and the other mains-powered appliance dependent upon said integral of the at least one of the current and the power consumption.

* * * * *